US012031456B2

(12) United States Patent
Taima

(10) Patent No.: US 12,031,456 B2
(45) Date of Patent: Jul. 9, 2024

(54) GAS TURBINE AND METHOD FOR ASSEMBLING RADIAL TURBINE NOZZLE

(71) Applicant: HONDA MOTOR CO., LTD., Tokyo (JP)

(72) Inventor: Koji Taima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/349,413

(22) Filed: Jul. 10, 2023

(65) Prior Publication Data

US 2024/0018876 A1 Jan. 18, 2024

(30) Foreign Application Priority Data

Jul. 13, 2022 (JP) ................................ 2022-112124

(51) Int. Cl.
*F01D 9/04* (2006.01)
*F01D 11/00* (2006.01)

(52) U.S. Cl.
CPC ............ *F01D 9/047* (2013.01); *F01D 11/003* (2013.01); *F05D 2240/128* (2013.01); *F05D 2240/55* (2013.01)

(58) Field of Classification Search
CPC ....... F01D 9/047; F01D 9/48; F05D 2240/128
See application file for complete search history.

(56) References Cited

U.S. PATENT DOCUMENTS

| | | | |
|---|---|---|---|
| 4,639,189 | A | 1/1987 | Rosman |
| 2009/0169370 | A1 | 7/2009 | Morgan et al. |

FOREIGN PATENT DOCUMENTS

| | | | |
|---|---|---|---|
| JP | S61-080304 | U | 5/1986 |
| JP | 04-112902 | A | 4/1992 |
| JP | 6-41722 | B2 | 6/1994 |
| JP | 2011-508152 | A | 3/2011 |

*Primary Examiner* — Brian O Peters
(74) *Attorney, Agent, or Firm* — Rankin, Hill & Clark LLP

(57) ABSTRACT

In a gas turbine and a method for assembling a radial turbine nozzle, the radial turbine nozzle is assembled in a manner so that a first ring and a second ring are assembled to an outer circumferential portion of a nozzle main body. The radial turbine nozzle is arranged on an outside of a first holder in a radial direction in a manner so that the inner circumferential portion of the nozzle main body can be seated on the first holder and the plurality of segments can move in the radial direction of the radial turbine.

3 Claims, 11 Drawing Sheets

GAS TURBINE AND METHOD FOR ASSEMBLING RADIAL TURBINE NOZZLE

CROSS-REFERENCE TO RELATED APPLICATIONS

This application is based upon and claims the benefit of priority from Japanese Patent Application No. 2022-112124 filed on Jul. 13, 2022, the contents of which are incorporated herein by reference.

BACKGROUND OF THE INVENTION

Field of the Invention

The present invention relates to a gas turbine and a method for assembling a radial turbine nozzle.

Description of the Related Art

JP H04-112902 A discloses a gas turbine that comprises a radial turbine, and a radial turbine nozzle (an inlet nozzle) surrounding the radial turbine. The radial turbine nozzle is equipped with an annular shaped nozzle main body. The nozzle main body is equipped with a plurality of blades, a first end wall (a ring plate), and a second end wall (a ring plate). The plurality of blades are arranged at predetermined intervals in the circumferential direction of the radial turbine. The first end wall is connected to one end part of the plurality of blades in an axial direction of the radial turbine. The second end wall is connected to another end part of the plurality of blades in the axial direction.

The nozzle main body includes a plurality of segments (divided pieces). The plurality of segments are connected in a circumferential direction. Each of the plurality of segments includes a first divided annular portion, and a second divided annular portion. The first divided annular portion is formed by dividing the first end wall at a plurality of first divided surfaces that are inclined with respect to a radial direction of the radial turbine. The second divided annular portion is formed by dividing the second end wall at a plurality of second divided surfaces that are inclined with respect to the radial direction.

A back plate that includes a stepped portion is provided in a turbine housing in which the radial turbine is accommodated. The first end wall is arranged on the back plate. The second end wall is arranged in an annular groove that is formed in the turbine housing. The first end wall is pressed toward an outer side in the radial direction by a ring spring, and thereby is placed in contact with the stepped portion of the back plate. Consequently, the radial turbine nozzle is positioned and fixed in place in the radial direction.

SUMMARY OF THE INVENTION

In JP H04-112902 A, since the radial turbine nozzle is positioned and fixed in place by the pressing force from the ring spring toward the first end wall, it is difficult to satisfactorily assemble the radial turbine nozzle to the gas turbine. Further, at a time when the gas turbine is placed in use, due to the combustion gas that passes through the radial turbine nozzle, the back plate and the turbine housing which serve as a casing become high in temperature. Consequently, the dimensions of the back plate and the turbine housing undergo a change due to thermal expansion, and a clearance between the plurality of segments becomes large. As a result, a concern arises in that the performance of the gas turbine may deteriorate.

The present invention has the object of solving the aforementioned problem.

A first aspect of the present invention is characterized by a gas turbine including a radial turbine, a radial turbine nozzle surrounding the radial turbine, and a retaining member configured to retain the radial turbine nozzle, the radial turbine nozzle including an annular shaped nozzle main body including a plurality of blades arranged at a predetermined interval in a circumferential direction of the radial turbine, a first end wall connected to one end part of each of the plurality of blades in an axial direction of the radial turbine, and a second end wall connected to another end part of each of the plurality of blades in the axial direction, a first ring surrounding the first end wall, and a second ring surrounding the second end wall, wherein the nozzle main body includes a plurality of segments connected in the circumferential direction, the first ring includes a first outer side groove that is recessed toward an outer side of the radial turbine in a radial direction, and extends in the circumferential direction, the second ring includes a second outer side groove that is recessed toward the outer side in the radial direction, and extends in the circumferential direction, each of the plurality of segments includes a first divided annular portion formed by dividing the first end wall at a plurality of first divided surfaces that are inclined with respect to the radial direction, and a second divided annular portion formed by dividing the second end wall at a plurality of second divided surfaces that are inclined with respect to the radial direction, and wherein an outer circumferential portion of the first divided annular portion includes a first flange member that projects toward the outer side in the radial direction, the first flange member being inserted into the first outer side groove, an outer circumferential portion of the second divided annular portion includes a second flange member that projects toward the outer side in the radial direction, the second flange member being inserted into the second outer side groove, an inner circumferential portion of the nozzle main body is configured to be seated on the retaining member; and the plurality of segments are configured to move in the radial direction.

A second aspect of the present invention is characterized by a method of assembling a radial turbine nozzle, wherein the radial turbine nozzle includes an annular nozzle main body including a plurality of blades arranged at a predetermined interval in a circumferential direction of the radial turbine, a first end wall connected to one end part of each of the plurality of blades in an axial direction of the radial turbine, and a second end wall connected to another end part of each of the plurality of blades in the axial direction, a first ring surrounding the first end wall, and a second ring surrounding the second end wall, wherein the nozzle main body includes a plurality of segments connected in the circumferential direction, the first ring includes a first outer side groove that is recessed toward an outer side of the radial turbine in a radial direction, and extends in the circumferential direction, the second ring includes a second outer side groove that is recessed toward the outer side in the radial direction, and extends in the circumferential direction, each of the plurality of segments includes a first divided annular portion formed by dividing the first end wall at a plurality of first divided surfaces that are inclined with respect to the radial direction, and a second divided annular portion formed by dividing the second end wall at a plurality of second divided surfaces that are inclined with respect to the radial direction, and wherein an outer circumferential portion of the first divided annular portion includes a first flange member that projects toward the outer side in the radial direction, the first flange member being inserted into the first outer side groove, an outer circumferential portion of the second divided annular portion includes a second flange member that projects toward the outer side in the radial direction, the second flange member being inserted into the second outer side groove, the method of assembling the radial turbine nozzle including a nozzle assembly step of assembling the radial turbine nozzle in a manner so that the first ring and the second ring are assembled to an outer circumferential portion of the nozzle main body, and a nozzle arrangement step of arranging the radial turbine nozzle on an outer side of a retaining member of the gas turbine in the radial direction in a manner so that an inner circumferential portion of the nozzle main body is configured to be seated on the retaining member and the plurality of segments are configured to move in the radial direction.

According to the present invention, during operation of the gas turbine, the inner peripheral portion of the nozzle main body is seated on the holding portion by the pressure of the combustion gas passing through the radial turbine nozzle. During operation of the gas turbine, the holder is at a lower temperature than the radial turbine nozzle. Therefore, a dimensional change of the holding portion due to thermal expansion is small. As a result, the radial turbine nozzle assembled to the gas turbine can be accurately positioned and fixed. Further, the first dividing surface and the second dividing surface are inclined with respect to the radial direction of the radial turbine. Accordingly, when the combustion gas passes through the radial turbine nozzle, the plurality of segments can be easily moved in the radial direction of the radial turbine. Further, since there is a clearance between the holding portion and the radial turbine nozzle, the radial turbine nozzle can be easily assembled to the gas turbine.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
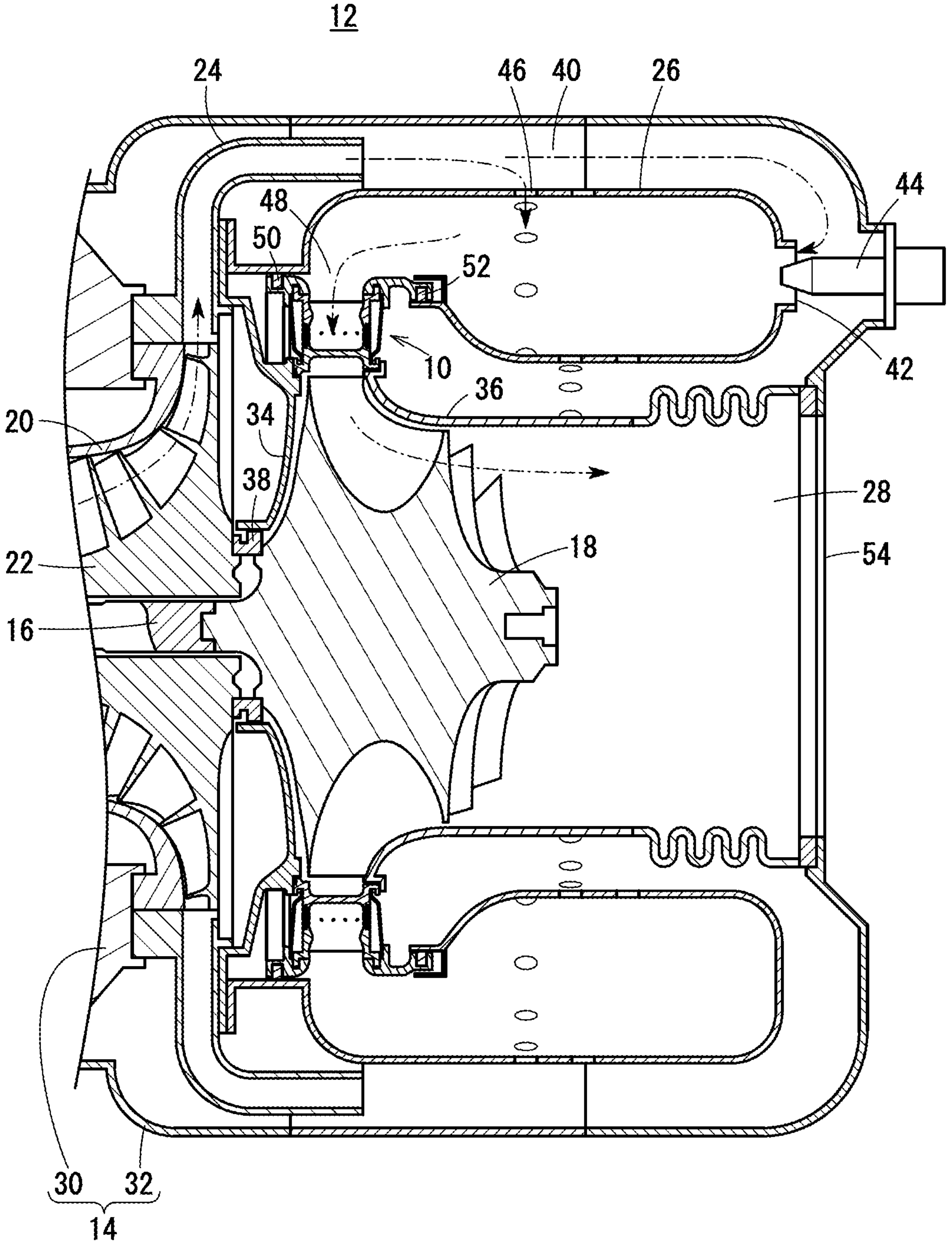
FIG. 1 is a cross-sectional view of a gas turbine.

FIG. 1 is a cross-sectional view of a gas turbine 12 equipped with a radial turbine nozzle 10.

The gas turbine 12 is equipped with a housing 14, a shaft 16, a radial turbine 18, the radial turbine nozzle 10, a shroud case 20, a compressor wheel 22, a diffuser 24, a combustor 26, and a gas exhaust member 28. Each of the respective parts of the gas turbine 12 is made of a heat-resistant metallic material.

The housing 14 includes an annular shaped first housing 30, and an annular shaped second housing 32. The first housing 30 and the second housing 32 are connected in the axial direction of the gas turbine 12 (the left-right direction in FIG. 1). The axial direction of the gas turbine 12 is the axial direction of the radial turbine 18. Hereinafter, the axial direction of the radial turbine nozzle 10 may also be simply referred to as an "axial direction". One end part of the first housing 30 in the axial direction is connected to a housing (not shown) of a rotating electric machine. Another end part of the first housing 30 in the axial direction is connected to the second housing 32.

The shroud case 20 is a hollow body that is arranged in the interior of the housing 14. The shroud case 20 is fixed to an inner circumferential surface of the first housing 30.

The shaft 16 is coaxially arranged inside the housing 14 together with the radial turbine 18. The shaft 16 is arranged inside the housing 14 in a manner so as to pass through the interior of the shroud case 20. One end part of the shaft 16 in the axial direction is connected to a rotating shaft (not shown) of the rotating electric machine. Another end part of the shaft 16 in the axial direction is connected to the radial turbine 18.

The compressor wheel 22 is attached to the shaft 16 on an inner side of the shroud case 20. Moreover, in FIG. 1, it should be noted that illustration of a connecting portion between the compressor wheel 22 and the shaft 16 is omitted. At a time when the rotating shaft of the rotating electric machine is rotated, the shaft 16, the compressor wheel 22, and the radial turbine 18 are capable of rotating together in an integral manner. In a space that is formed between the compressor wheel 22 and the shroud case 20, air that is drawn in from the outside flows therethrough as indicated by the one-dot-dashed arrows. By the compressor wheel 22 rotating, the air that is drawn in from the outside is compressed, and becomes compressed air.

In the interior of the second housing 32, there are arranged the other end part of the shaft 16, the radial turbine 18, the radial turbine nozzle 10, one portion of the shroud case 20, one portion of the compressor wheel 22, the diffuser 24, the combustor 26, and the gas exhaust member 28. A first holder 34 (a retaining member) and a second holder 36 are arranged in the interior of the second housing 32.

The diffuser 24 is a hollow body. The diffuser 24 is fixed together with the shroud case 20 to the inner circumferential surface of the first housing 30. The diffuser 24 is arranged in the interior of the second housing 32, in a manner so as to surround one portion of the shroud case 20, one portion of the compressor wheel 22, the first holder 34, and the radial turbine 18. The diffuser 24 causes the compressed air that is generated by the compressor wheel 22 to flow.

The first holder 34 is an annular shaped hollow body. An outer circumferential portion of the first holder 34 is fixed to the diffuser 24. The first holder 34 surrounds the rear side surface of the radial turbine 18 that is connected to the shaft 16. An annular shaped seal ring 38 is interposed between the inner circumferential portion of the first holder 34 and the compressor wheel 22.

The combustor 26 is an annular shaped member. The combustor 26 is fixed together with the first holder 34 to the diffuser 24. The combustor 26 surrounds the radial turbine nozzle 10, the radial turbine 18, and the gas exhaust member 28.

An annular shaped gas flow passage 40 is formed between an inner circumferential surface of the second housing 32 and the combustor 26. As indicated by the one-dot-dashed arrows, the gas flow passage 40 supplies the compressed air that is introduced from the diffuser 24 to the combustor 26. An inlet opening 42 for introducing the compressed air is formed in the combustor 26. A fuel supply nozzle 44 is fixed to the second housing 32. The fuel supply nozzle 44 is positioned so as to enter into the inlet opening 42 of the combustor 26. The fuel supply nozzle 44 supplies fuel to the combustor 26.

A plurality of relay holes 46 are formed in the combustor 26. The plurality of relay holes 46 communicate between the gas flow passage 40 and the interior of the combustor 26.

The combustor 26 mixes and causes the fuel supplied from the fuel supply nozzle 44 and the compressed air to undergo combustion, thereby generating a high temperature combustion gas. As indicated by the one-dot-dashed arrows, the combustion gas is discharged to the radial turbine nozzle 10 via an exhaust port 48 that is formed in the combustor 26.

The radial turbine nozzle 10 is arranged in the interior of the second housing 32 so as to face toward the exhaust port 48 of the combustor 26. The radial turbine nozzle 10 is an annular shaped member that surrounds the radial turbine 18. Annular shaped seal rings 50 and 52 are interposed between the radial turbine nozzle 10 and the combustor 26.

The gas exhaust member 28 is an annular shaped member. One end part of the gas exhaust member 28 in the axial direction is curved toward the outer side (the up-down direction shown in FIG. 1) in the radial direction of the radial turbine 18. Hereinafter, the radial direction of the radial turbine 18 may also be simply referred to as a "radial direction". The one end part of the gas exhaust member 28 faces toward the first holder 34 in the axial direction. One portion of the gas exhaust member 28 including the one end part of the gas exhaust member 28 surrounds one portion of the radial turbine 18. Within the gas exhaust member 28, a portion that surrounds the one portion of the radial turbine 18 is constituted as the second holder 36. Another end part of the gas exhaust member 28 in the axial direction is fixed to the second housing 32. An exhaust port 54 is formed at the other end part of the gas exhaust member 28.

The combustion gas, which is introduced into the radial turbine 18 through the radial turbine nozzle 10, causes the radial turbine 18 to rotate. The combustion gas is discharged as an exhaust gas to the exterior from the exhaust port 54 of the combustor 26.

The first holder 34 and the second holder 36 retain the radial turbine nozzle 10 on an inner side in the radial direction.

Next, a description will be given with reference to FIGS. 2 to 8 concerning the configuration of the radial turbine nozzle 10.

Figure 2:
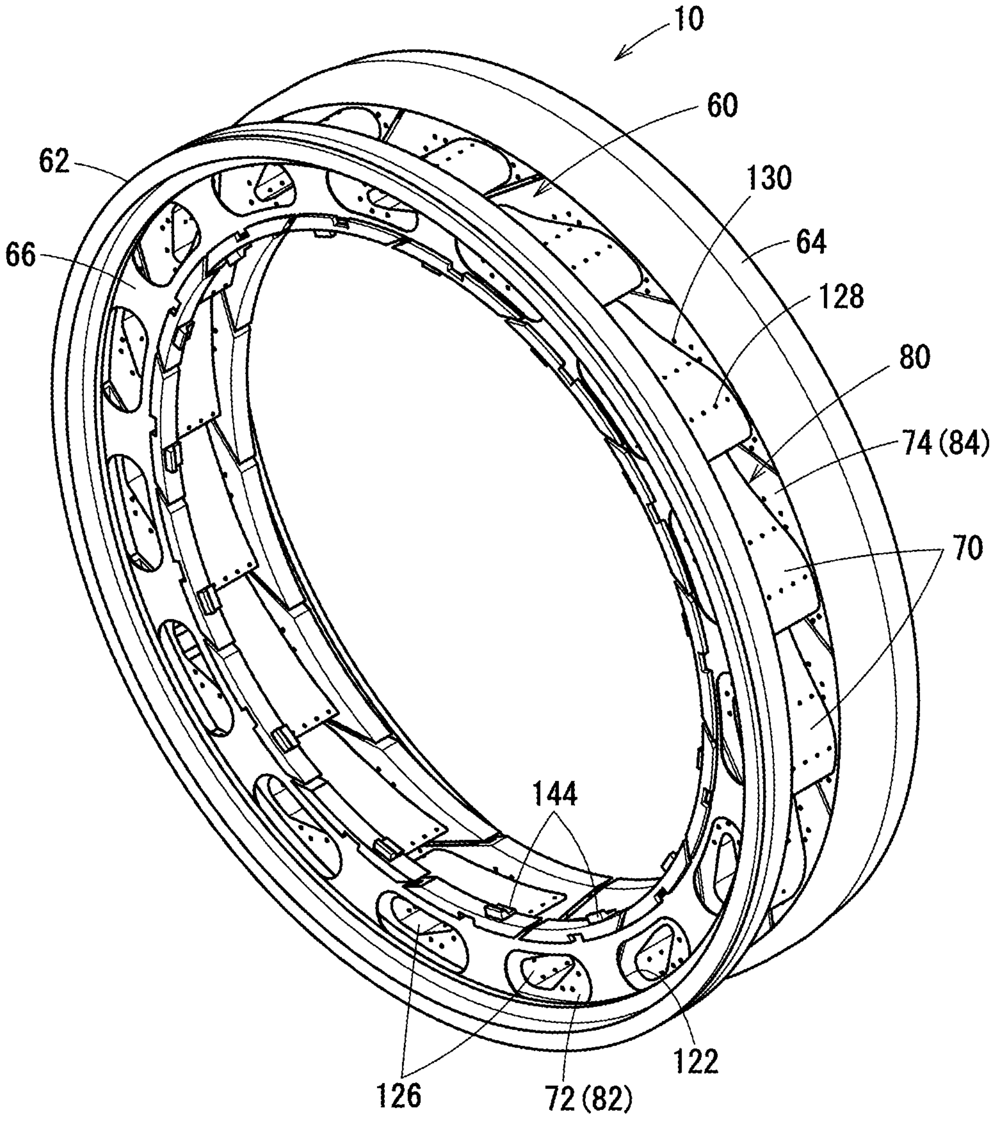
FIG. 2 is a perspective view of a radial turbine nozzle.
Figure 3:
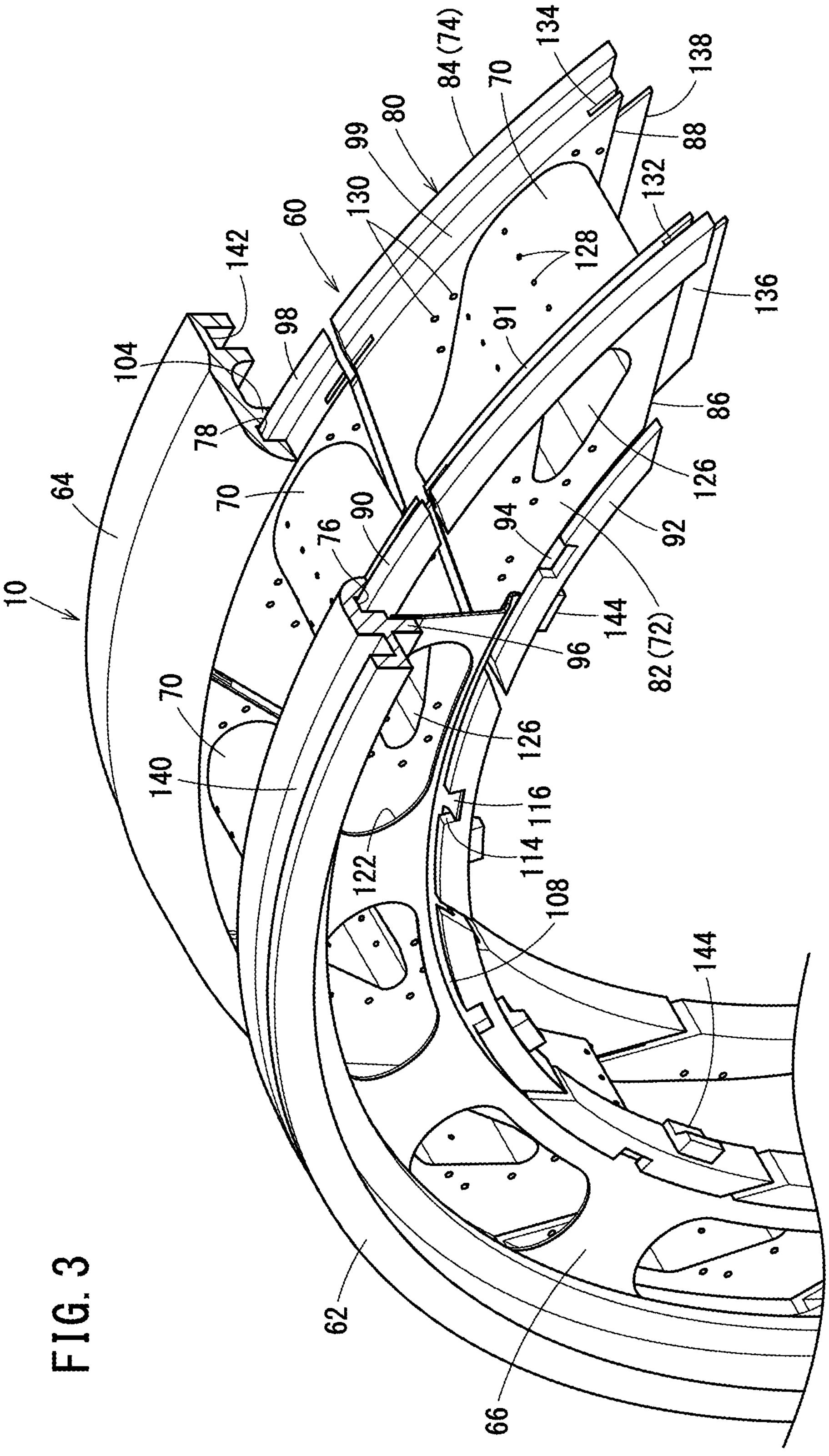
FIG. 3 is a partially cut away perspective view of the radial turbine nozzle.
Figure 4:
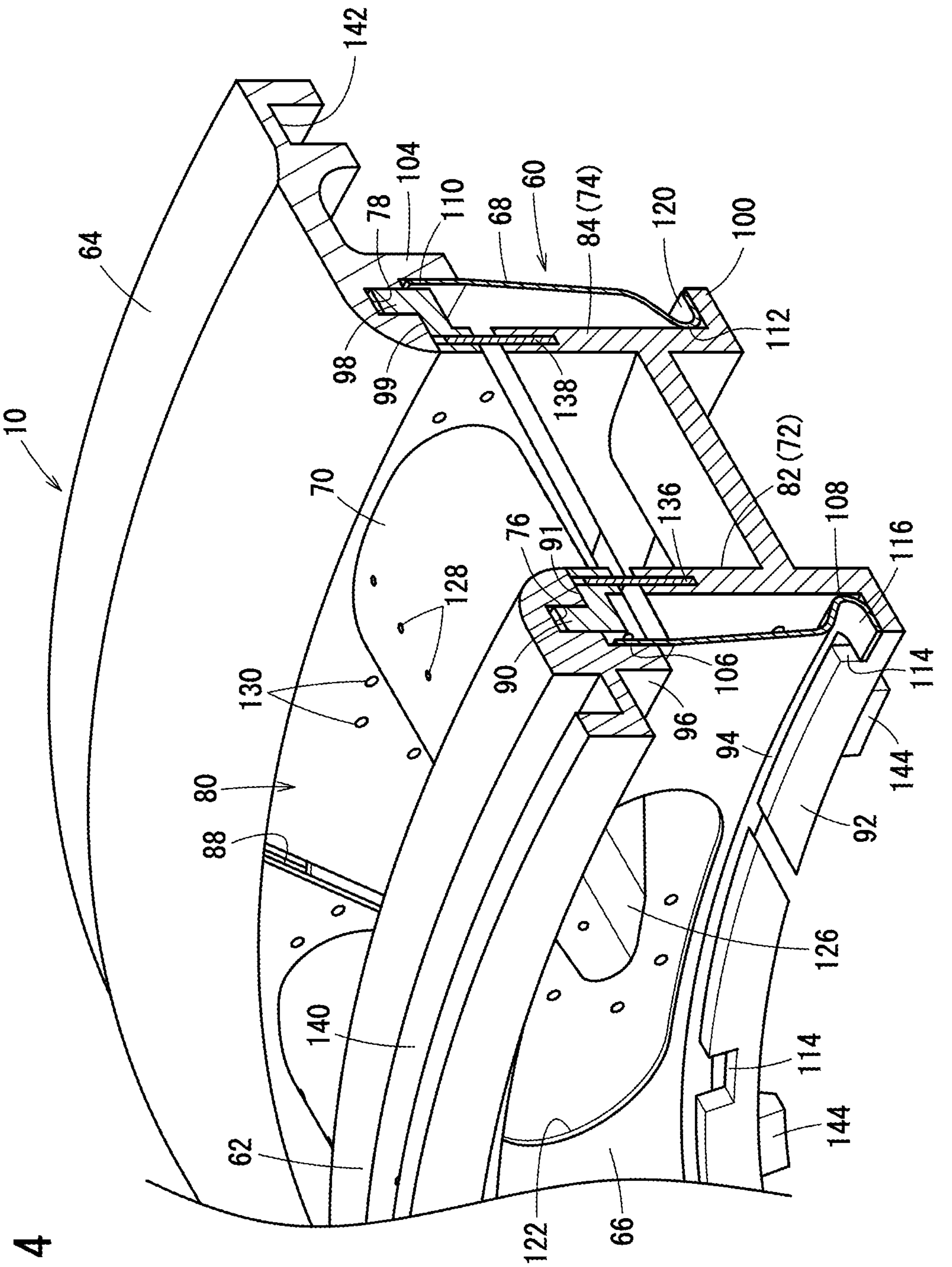
FIG. 4 is a partially cut away perspective view of the radial turbine nozzle.

As shown in FIGS. 2 to 4, the radial turbine nozzle 10 comprises a nozzle main body 60, a first ring 62, a second ring 64, a first pressing member 66, and a second pressing member 68.

The nozzle main body 60 includes a plurality of blades 70, an annular shaped first end wall 72, and an annular shaped second end wall 74.

Figure 8:
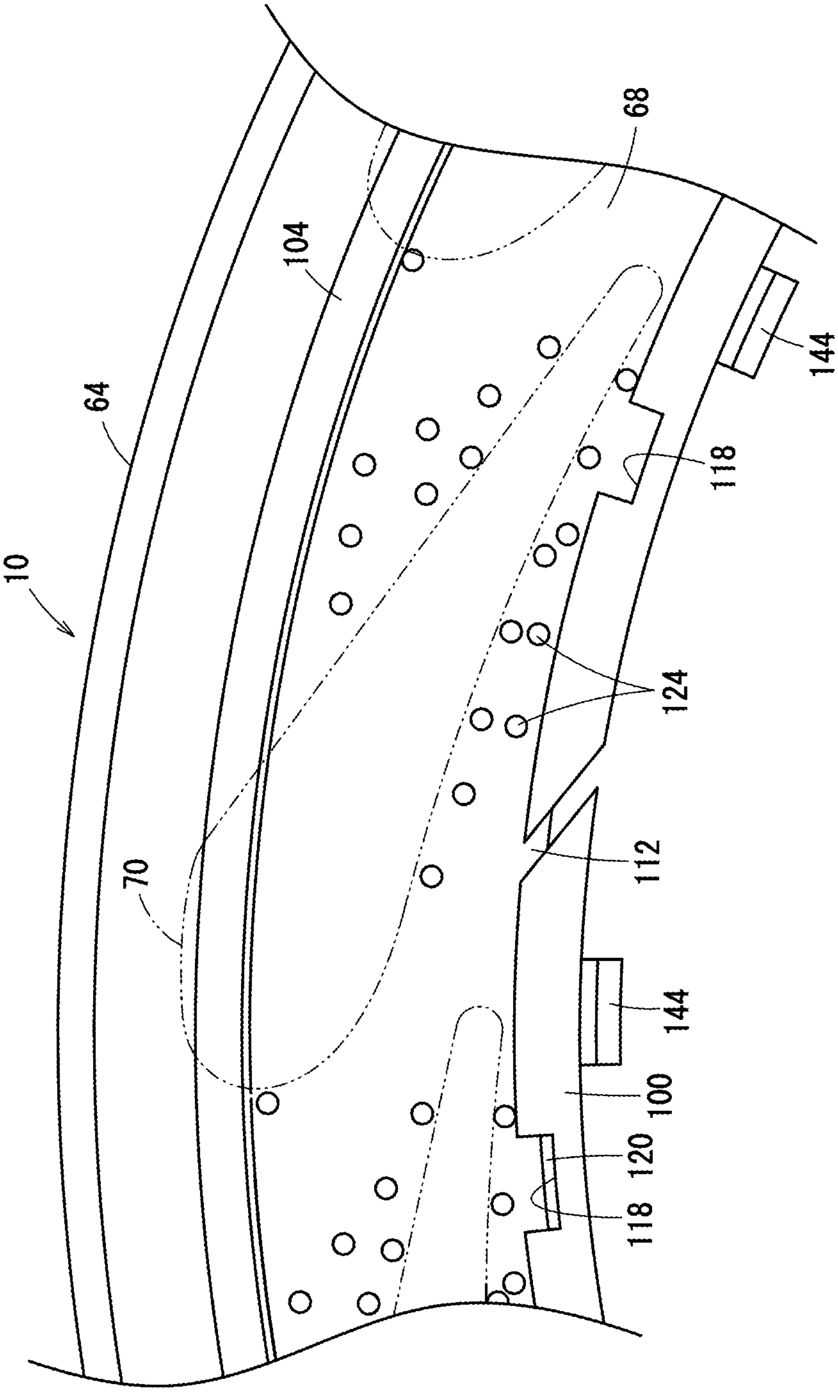
FIG. 8 is a partial side view of the radial turbine nozzle.

The plurality of blades 70 are arranged at predetermined intervals in the circumferential direction of the radial turbine 18 (a direction around the axis of the radial turbine 18). Hereinafter, the circumferential direction of the radial turbine 18 may also be simply referred to as a "circumferential direction". As shown in FIG. 3 and FIG. 8, each of the plurality of blades 70 is formed to have an airfoil profile. Each of the plurality of blades 70 is inclined with respect to the radial direction and the circumferential direction. Each of the plurality of blades 70 are formed with a smaller blade thickness as the blades 70 proceed toward the inner side in the radial direction.

As shown in FIGS. 3 to 7, the first end wall 72 is connected to one end part of each of the plurality of blades 70 in the axial direction. The second end wall 74 is connected to another end part of each of the plurality of blades 70 in the axial direction. Each of the first end wall 72 and the second end wall 74 projects out in the radial direction more so than the plurality of blades 70.

As shown in FIGS. 2 and 3, the first ring 62 is an annular shaped member that surrounds the first end wall 72. The second ring 64 is an annular shaped member that surrounds the second end wall 74.

As shown in FIGS. 3 to 7, the first ring 62 includes a first outer side groove 76. The first outer side groove 76 is formed in an inner circumferential portion of the first ring 62. On the inner circumferential portion of the first ring 62, the first outer side groove 76 is recessed toward an outer side in the radial direction. On the inner circumferential portion of the first ring 62, the first outer side groove 76 extends in an annular shape in the circumferential direction.

The second ring 64 includes a second outer side groove 78. The second outer side groove 78 is formed in an inner circumferential portion of the second ring 64. On the inner circumferential portion of the second ring 64, the second outer side groove 78 is recessed toward an outer side in the radial direction. On the inner circumferential portion of the second ring 64, the second outer side groove 78 extends in an annular shape in the circumferential direction.

The nozzle main body 60 includes a plurality of segments 80. The nozzle main body 60 is constituted by connecting together the plurality of segments 80 in the circumferential direction.

Each of the plurality of segments 80 includes the blade 70, a first divided annular portion 82, and a second divided annular portion 84.

As shown in FIG. 3 and FIG. 4, the first end wall 72 is divided by a plurality of first divided surfaces 86. Each of the first divided surfaces 86 is inclined with respect to the radial direction and the circumferential direction. The first divided annular portion 82 is formed by dividing the first end wall 72 into the plurality of first divided surfaces 86.

The second end wall 74 is divided by a plurality of second divided surfaces 88. Each of the second divided surfaces 88 is inclined with respect to the radial direction and the circumferential direction. The second divided annular portion 84 is formed by dividing the second end wall 74 into the plurality of second divided surfaces 88.

In each of the segments 80, the first divided surface 86 and the second divided surface 88 at one end side in the circumferential direction are surfaces that are parallel to each other. In each of the segments 80, the first divided surface 86 and the second divided surface 88 at another end side in the circumferential direction are surfaces that are parallel to each other.

Figure 5:
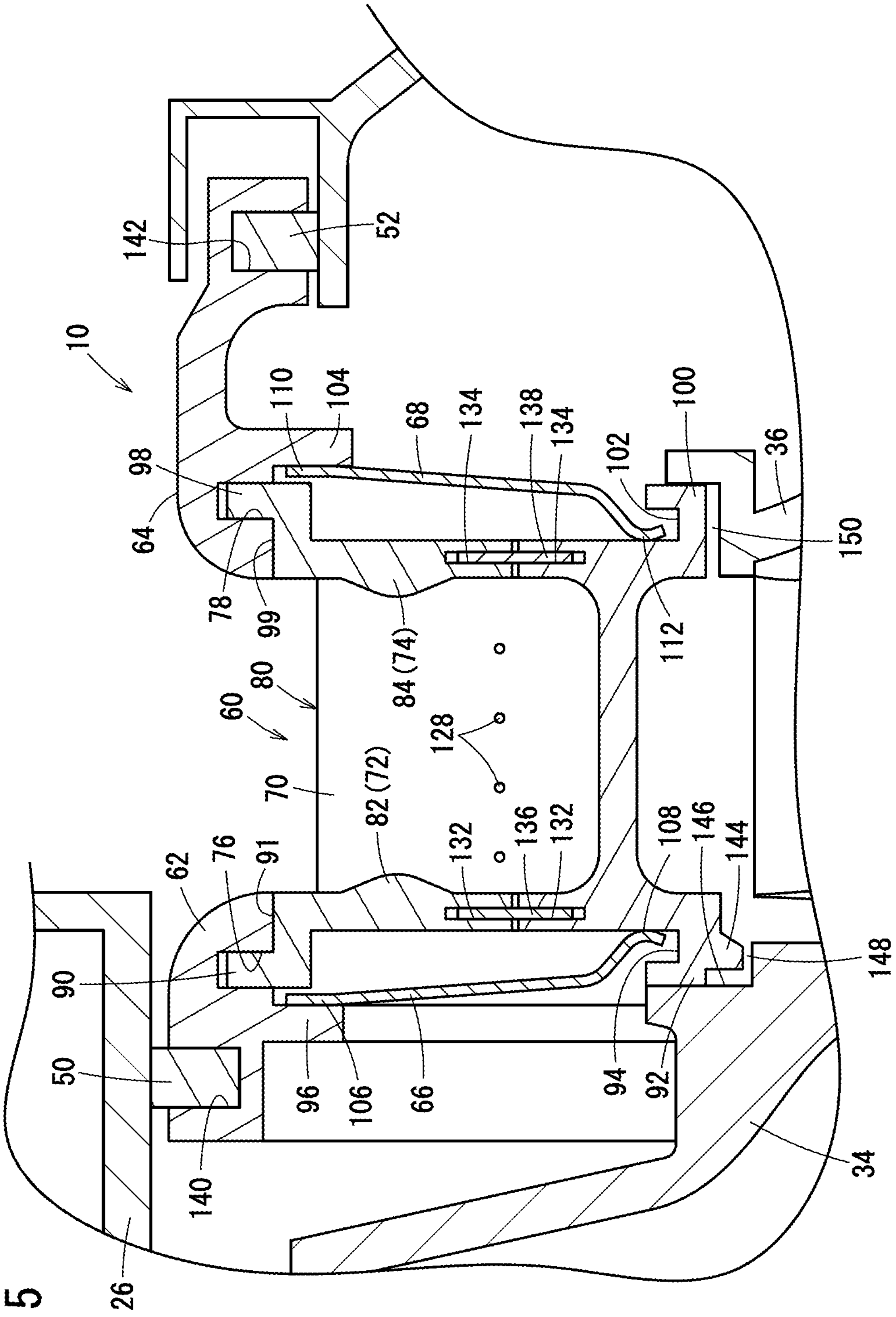
FIG. 5 is a cross-sectional view of the radial turbine nozzle.
Figure 6:
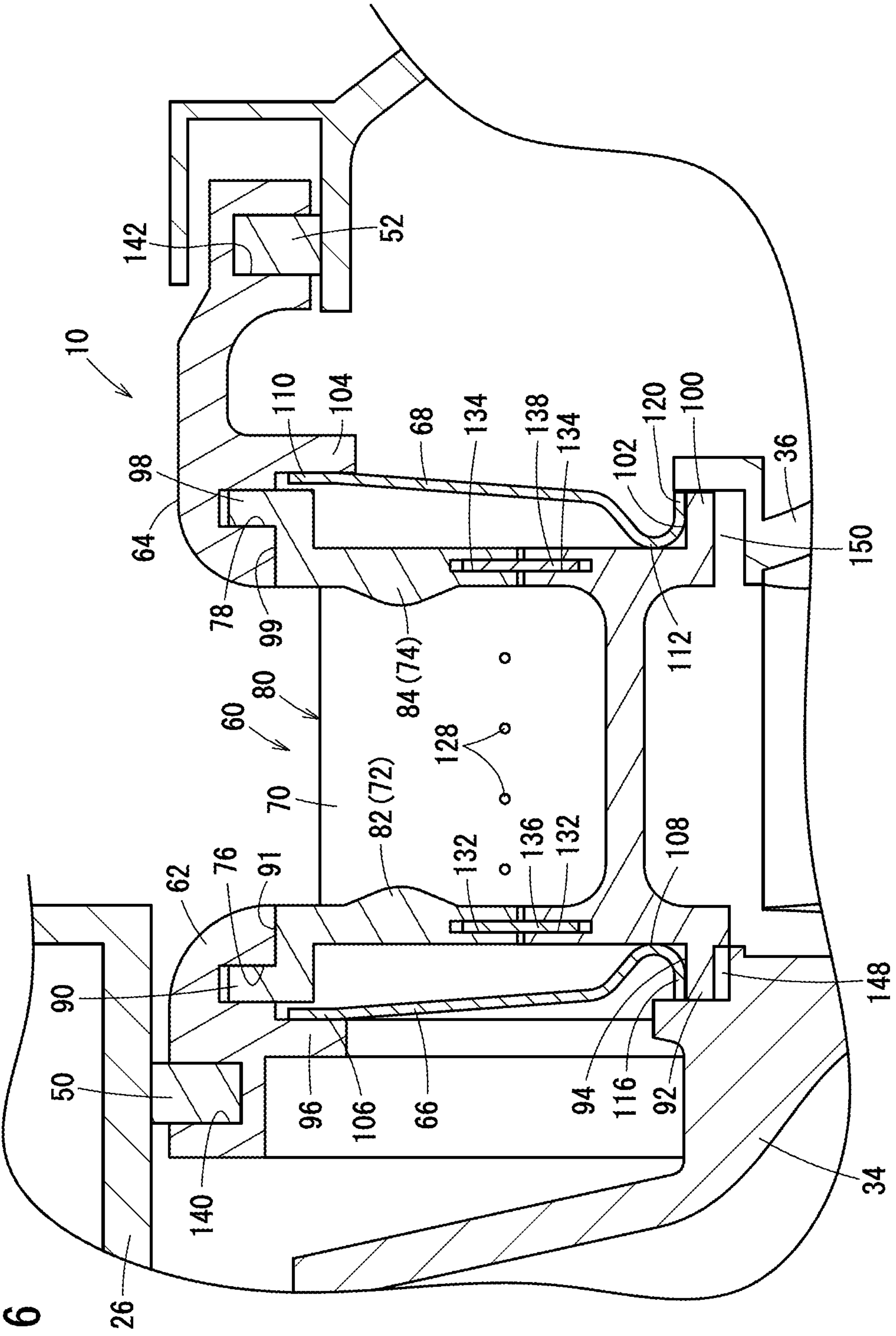
FIG. 6 is a cross-sectional view of the radial turbine nozzle.
Figure 7:
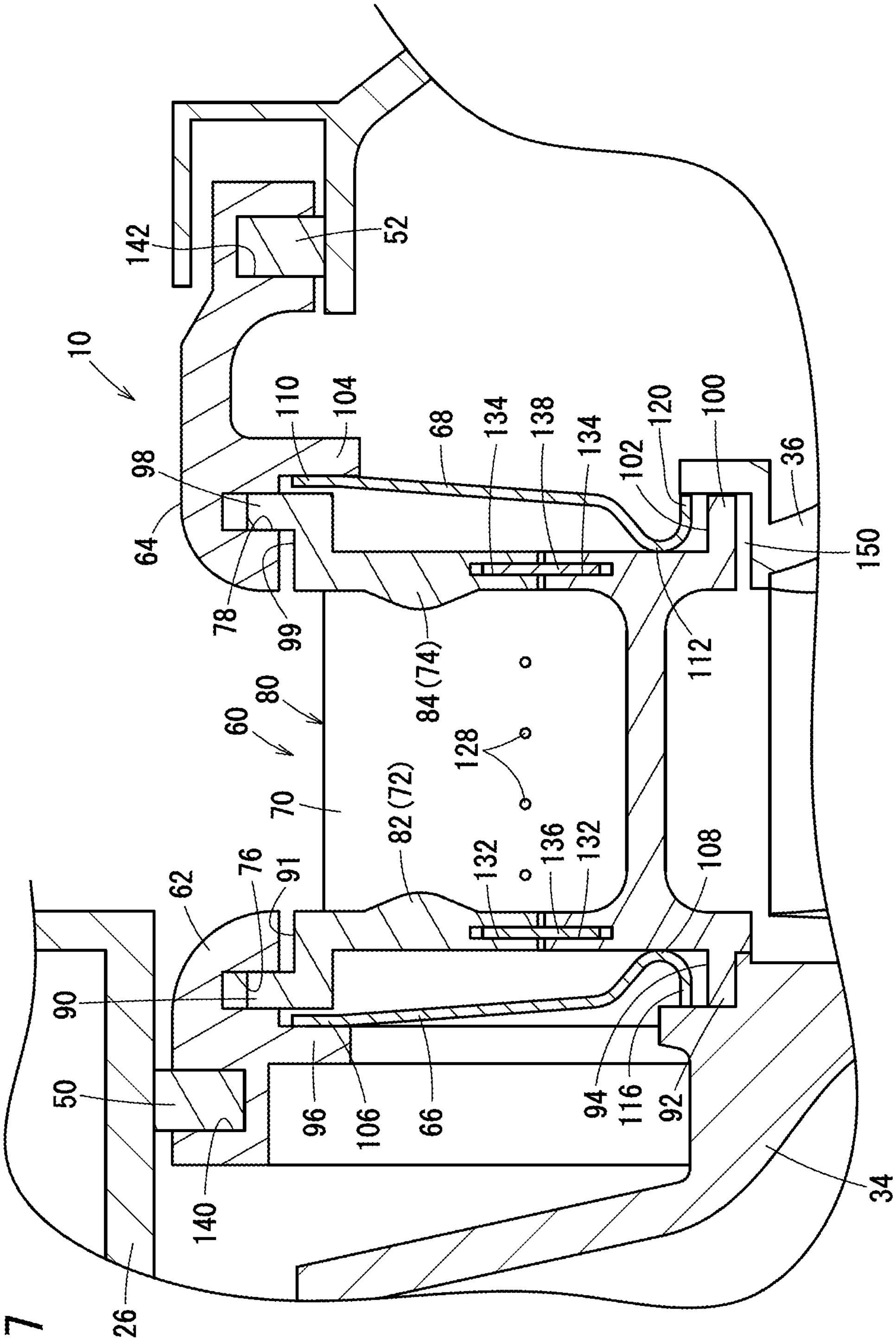
FIG. 7 is a cross-sectional view of the radial turbine nozzle.

As shown in FIGS. 5 to 7, an outer circumferential portion of the first divided annular portion 82 projects toward the outer side in the axial direction. A first flange member 90 is formed on an outer side portion in the axial direction on the outer circumferential portion of the first divided annular portion 82. The first flange member 90 projects toward the outer side in the radial direction, and extends in the circumferential direction. The first flange member 90 is inserted into the first outer side groove 76 of the first ring 62. As shown in FIG. 5 and FIG. 6, immediately after the radial turbine nozzle 10 is assembled onto the gas turbine 12, a stepped portion 91 adjacent to the first flange member 90 on the outer circumferential portion of the first divided annular portion 82 is placed in contact with an inner circumferential portion of the first ring 62.

As shown in FIGS. 5 to 7, a first projecting member 92 is provided on the inner circumferential portion of the first divided annular portion 82. The first projecting member 92 projects toward the outer side in the axial direction from the inner circumferential portion of the first divided annular portion 82, and extends in the circumferential direction. A first inner side groove 94 is formed in the first projecting member 92. The first inner side groove 94 is formed in an outer side portion in the radial direction of the first projecting member 92. The first inner side groove 94 is recessed toward an inner side in the radial direction. The first inner side groove 94 extends in the circumferential direction (refer to FIG. 3 and FIG. 4).

A first inner circumferential projection 96 is formed on the inner circumferential portion of the first ring 62. The first inner circumferential projection 96 is formed on an outer side in the axial direction of the first outer side groove 76 on the inner circumferential portion of the first ring 62. The first inner circumferential projection 96 projects toward an inner side in the radial direction from the inner circumferential portion of the first ring 62. The first inner circumferential projection 96 is spaced toward the outer side in the axial direction relative to the first flange member 90 of each of the plurality of segments 80. The first inner circumferential projection 96 extends in an annular shape in the circumferential direction (refer to FIG. 3 and FIG. 4).

An outer circumferential portion of the second divided annular portion 84 projects toward the outer side in the axial direction. A second flange member 98 is formed on an outer side portion in the axial direction on the outer circumferential portion of the second divided annular portion 84. The second flange member 98 projects toward the outer side in the radial direction, and extends in the circumferential direction. The second flange member 98 is inserted into the second outer side groove 78. As shown in FIG. 5 and FIG. 6, immediately after the radial turbine nozzle 10 is assembled onto the gas turbine 12, a stepped portion 99 adjacent to the second flange member 98 on the outer circumferential portion of the second divided annular portion 84 is placed in contact with an inner circumferential portion of the second ring 64.

As shown in FIGS. 5 to 7, a second projecting member 100 is provided on the inner circumferential portion of the second divided annular portion 84. The second projecting member 100 projects toward the outer side in the axial direction from the inner circumferential portion of the second divided annular portion 84, and extends in the circumferential direction. A second inner side groove 102 is formed in the second projecting member 100. The second inner side groove 102 is formed in an outer side portion in the radial direction of the second projecting member 100. The second inner side groove 102 is recessed toward an inner side in the radial direction. The second inner side groove 102 extends in the circumferential direction.

A second inner circumferential projection 104 is formed on the inner circumferential portion of the second ring 64. The second inner circumferential projection 104 is formed on an outer side in the axial direction of the second outer side groove 78 on the inner circumferential portion of the second ring 64. The second inner circumferential projection 104 projects toward an inner side in the radial direction from the inner circumferential portion of the second ring 64. The second inner circumferential projection 104 is spaced toward the outer side in the axial direction relative to the second flange member 98 of each of the plurality of segments 80. The second inner circumferential projection 104 extends along the circumferential direction.

As shown in FIGS. 2 to 4, the first pressing member 66 is an annular shaped plate spring. As shown in FIGS. 3 to 7, the first pressing member 66 is arranged between the first end wall 72 and the first ring 62. More specifically, in each of the plurality of segments 80, an outer circumferential portion 106 of the first pressing member 66 is arranged between the first inner circumferential projection 96 and the outer circumferential portion of the first divided annular portion 82. An inner circumferential portion 108 of the first pressing member 66 is arranged in the first inner side groove 94.

The first inner circumferential projection 96 presses the outer circumferential portion 106 of the first pressing member 66 toward the inner side in the axial direction. More specifically, the first inner circumferential projection 96 presses the outer circumferential portion 106 of the first pressing member 66 toward the nozzle main body 60. The inner circumferential portion 108 of the first pressing member 66 presses the first divided annular portion 82 of each of the plurality of segments 80 toward the inner side in the axial direction.

The second pressing member 68 is an annular shaped plate spring in the same manner as the first pressing member 66. The second pressing member 68 is arranged between the second end wall 74 and the second ring 64. More specifically, in each of the plurality of segments 80, an outer circumferential portion 110 of the second pressing member 68 is arranged between the second inner circumferential projection 104 and the outer circumferential portion of the second divided annular portion 84. An inner circumferential portion 112 of the second pressing member 68 is arranged in the second inner side groove 102.

The second inner circumferential projection 104 presses the outer circumferential portion 110 of the second pressing member 68 toward the inner side in the axial direction. More specifically, the second inner circumferential projection 104 presses the outer circumferential portion 110 of the second pressing member 68 toward the nozzle main body 60. The inner circumferential portion 112 of the second pressing member 68 presses the second divided annular portion 84 of each of the plurality of segments 80 toward the inner side in the axial direction.

As shown in FIGS. 3 and 4, a first notch member 114 is formed in the first projecting member 92 of at least one of the segments 80 from among the plurality of segments 80. The first notch member 114 penetrates in the axial direction through the first projecting member 92. The first notch member 114 communicates with the first inner side groove

94. Moreover, in FIG. 3 and FIG. 4, a case is illustrated in which the first notch member 114 is formed in each of the plurality of segments 80.

As shown in FIGS. 3, 4, 6, and 7, a first projection 116 is provided on the inner circumferential portion 108 of the first pressing member 66. The first projection 116 projects out in the axial direction to the outer side from the inner circumferential portion 108 of the first pressing member 66. The first projection 116 is inserted into the first notch member 114.

As shown in FIG. 8, a second notch member 118 is formed in the second projecting member 100 of at least one of the segments from among the plurality of segments 80 (refer to FIGS. 3 to 7). The second notch member 118 penetrates in the axial direction through the second projecting member 100. The second notch member 118 communicates with the second inner side groove 102 (refer to FIG. 5). Moreover, in FIG. 8, a case is illustrated in which the second notch member 118 is formed in each of the plurality of segments 80.

As shown in FIGS. 4, 6, 7, and 8, a second projection 120 is provided on the inner circumferential portion 112 of the second pressing member 68. The second projection 120 projects out in the axial direction to the outer side from the inner circumferential portion 112 of the second pressing member 68. The second projection 120 is inserted into the second notch member 118.

As shown in FIGS. 2 to 4, a plurality of first holes 122 are formed in the first pressing member 66. Each of the plurality of first holes 122 penetrates in the axial direction through the first pressing member 66.

As shown in FIG. 8, a plurality of second holes 124 are formed in the second pressing member 68. Each of the plurality of second holes 124 penetrates in the axial direction through the second pressing member 68.

As shown in FIGS. 2 to 4, hollow portions 126 are formed in the interior of each of the plurality of blades 70. The hollow portions 126 open on the first end wall 72. The plurality of first holes 122 of the first pressing member 66 are formed in the first pressing member 66 at intervals in the circumferential direction, in a manner so as to face toward the hollow portions 126 of the plurality of blades 70. Each of the plurality of first holes 122 is larger than each of the plurality of second holes 124.

As shown in FIG. 8, the plurality of second holes 124 are formed in the second pressing member 68 in a manner so as to surround each of the plurality of blades 70 when the second pressing member 68 is viewed from the axial direction.

As shown in FIGS. 2 to 4, each of the plurality of blades 70 is formed with a plurality of first communication holes 128 that communicate between an outer side and an inner side of the blades 70 (the hollow portions 126). Further, a plurality of second communication holes 130 are formed in the second divided annular portion 84 of each of the plurality of blades 70. The plurality of second communication holes 130 are formed in the axial direction in a manner so as to avoid the hollow portions 126.

As shown in FIG. 3 and FIGS. 5 to 7, a first insertion groove 132 is formed in each of the plurality of first divided surfaces 86 (refer to FIG. 3 and FIG. 4). The first insertion groove 132 is a groove that is recessed in the circumferential direction from each of the first divided surfaces 86. The first insertion groove 132 extends along each of the first divided surfaces 86 from an outer circumferential portion toward an inner circumferential portion of the first divided annular portion 82. Specifically, an outer side (outer end) in the radial direction of the first insertion groove 132 is open. An inner side (inner end) in the radial direction of the first insertion groove 132 is closed. A plate-shaped first seal member 136 is inserted into of the first insertion groove 132.

A second insertion groove 134 is formed in each of the plurality of second divided surfaces 88. The second insertion groove 134 is a groove that is recessed in the circumferential direction from each of the second divided surfaces 88. The second insertion groove 134 extends along each of the second divided surfaces 88 from an outer circumferential portion toward an inner circumferential portion of the second divided annular portion 84. Specifically, an outer side (outer end) in the radial direction of the second insertion groove 134 is open. An inner side (inner end) in the radial direction of the second insertion groove 134 is closed. A plate-shaped second seal member 138 is inserted into the second insertion groove 134.

In the segments 80 that lie adjacent to each other, one portion of the first seal member 136 is inserted into one of the first insertion grooves 132 that face toward each other, and another portion of the first seal member 136 is inserted into another of the first insertion grooves 132 that face toward each other. More specifically, one end part of the first seal member 136 in the circumferential direction is inserted into the first insertion groove 132 of one of the segments 80. Another end part of the first seal member 136 in the circumferential direction is inserted into the first insertion groove 132 of the other of the segments 80.

In the segments 80 that lie adjacent to each other, one portion of the second seal member 138 is inserted into one of the second insertion grooves 134 that face toward each other, and another portion of the second seal member 138 is inserted into another of the second insertion grooves 134 that face toward each other. More specifically, one end part of the second seal member 138 in the circumferential direction is inserted into the second insertion groove 134 of one of the segments 80. Another end part of the second seal member 138 in the circumferential direction is inserted into the second insertion groove 134 of the other of the segments 80.

Accordingly, a space between two of the segments 80 that lie adjacent to each other is sealed by the first seal member 136 and the second seal member 138.

As shown in FIGS. 3 to 7, a first outer circumferential groove 140 is formed in the outer circumferential portion of the first ring 62. In the outer circumferential portion of the first ring 62, the first outer circumferential groove 140 is recessed toward an inner side in the radial direction. The first outer circumferential groove 140 extends in an annular shape in the circumferential direction in the outer circumferential portion of the first ring 62. The annular shaped seal ring 50 (see FIG. 1 and FIGS. 5 to 7) is inserted into the first outer circumferential groove 140.

A second outer circumferential groove 142 is formed in the outer circumferential portion of the second ring 64. In the outer circumferential portion of the second ring 64, the second outer circumferential groove 142 is recessed toward an outer side in the radial direction. The second outer circumferential groove 142 extends in an annular shape in the circumferential direction in the outer circumferential portion of the second ring 64. The annular shaped seal ring 52 (see FIG. 1 and FIGS. 5 to 7) is inserted into the second outer circumferential groove 142.

An inner circumferential portion of the nozzle main body 60 can be seated on the first holder 34. Further, the plurality of segments 80 are capable of moving in the radial direction.

Specifically, as shown in FIGS. 3 to 5, concerning each of the segments 80, a fitting projection 144 is formed on the inner circumferential portion of the first divided annular portion 82. The fitting projection 144 projects to an inner side in the radial direction from the inner circumferential portion of the first divided annular portion 82. A plurality of slots 146 are formed in the first holder 34. The plurality of slots 146 are formed to be spaced at intervals from each other in the circumferential direction, in a manner so as to face toward the fitting projections 144 of the plurality of segments 80. The plurality of the fitting projections 144 are inserted respectively into the plurality of slots 146.

The first holder 34 is placed in surface contact with respect to the first projecting member 92 in the axial direction. An outer circumferential portion of the second holder 36 is placed in surface contact with respect to the second projecting member 100 in the axial direction.

As shown in FIG. 6, immediately after the radial turbine nozzle 10 has been assembled onto the gas turbine 12, a clearance 148 is provided between the inner circumferential portion of the first divided annular portion 82 of each of the plurality of segments 80 and the first holder 34. A clearance 150 is provided between the inner circumferential portion of the second divided annular portion 84 and the second holder 36.

A description will be given concerning operations of the gas turbine 12 which is configured in the manner described above.

As shown in FIG. 1, the compressor wheel 22 draws in air from the exterior and compresses the air. The compressed air is supplied to the gas flow passage 40 via the diffuser 24. The gas flow passage 40 supplies the compressed air to the combustor 26. The fuel supply nozzle 44 supplies fuel to the combustor 26. The combustor 26 mixes and causes the fuel supplied from the fuel supply nozzle 44 and the compressed air to undergo combustion, thereby generating a combustion gas. The combustion gas is supplied to the radial turbine nozzle 10 via the exhaust port 48.

The combustion gas impinges on the plurality of blades 70 toward the inner side in the radial direction. As shown in FIG. 2, FIG. 3, and FIG. 8, the plurality of blades 70 are inclined at a predetermined angle with respect to the radial direction. Accordingly, the plurality of blades 70 change the direction in which the combustion gas flows to a direction along the predetermined angle. The combustion gas the flow direction of which has been changed passes through between the plurality of blades 70, and is injected into the radial turbine 18 (refer to FIG. 1). The injected combustion gas collides against the blades of the radial turbine 18, and thereby causes the radial turbine 18 to rotate. Consequently, the radial turbine 18, the shaft 16, and the rotating shaft rotate together in an integral manner, and the rotating electric machine generates electrical power. The combustion gas that has passed through the radial turbine 18 is discharged to the exterior via the exhaust port 54 of the gas exhaust member 28.

As shown in FIG. 3 and FIG. 4, a cooling gas such as air or the like which is drawn in from the exterior is supplied to the plurality of hollow portions 126 via the plurality of first holes 122. In accordance with this feature, the plurality of first divided annular portions 82 and the plurality of blades 70 can be efficiently cooled. The cooling gas that is supplied to the hollow portions 126 passes through the plurality of first communication holes 128 that are formed in the blades 70, and is discharged together with the combustion gas to the exterior from the exhaust port 54 of the gas exhaust member 28 (refer to FIG. 1).

As shown in FIG. 4 and FIG. 8, a cooling gas such as air or the like which is drawn in from the exterior is supplied, via the plurality of second holes 124, into the space between the second pressing member 68 and the second divided annular portion 84. In accordance with this feature, the plurality of second divided annular portions 84 can be efficiently cooled. The cooling gas that is supplied to the space passes through the plurality of second communication holes 130 that are formed in the second divided annular portion 84, and is discharged together with the combustion gas to the exterior from the exhaust port 54 of the gas exhaust member 28 (refer to FIG. 1).

Next, a description will be given with reference to FIGS. 9 to 11B concerning a method of assembling the radial turbine nozzle 10, and a method of assembling the radial turbine nozzle 10 to the gas turbine 12.

First, a description concerning a method of assembling the radial turbine nozzle 10 will be described with reference to the flowchart of FIG. 9, and FIGS. 10 to 11B.

In such a method of assembling, a jig for sliding 162 (refer to FIG. 10) may be used. In the case that the jig for sliding 162 is used, in step S1 of FIG. 9, the jig for sliding 162 is arranged in a central portion of a plate-shaped base jig 160. In FIG. 10, concerning the jig for sliding 162, only the outer circumferential portion thereof is shown by the two-dot-dashed line. A plurality of pressing members 164 which are capable of pressing the inner circumferential portions of the plurality of segments 80 are formed on the outer circumferential portion of the jig for sliding 162.

Figure 9:
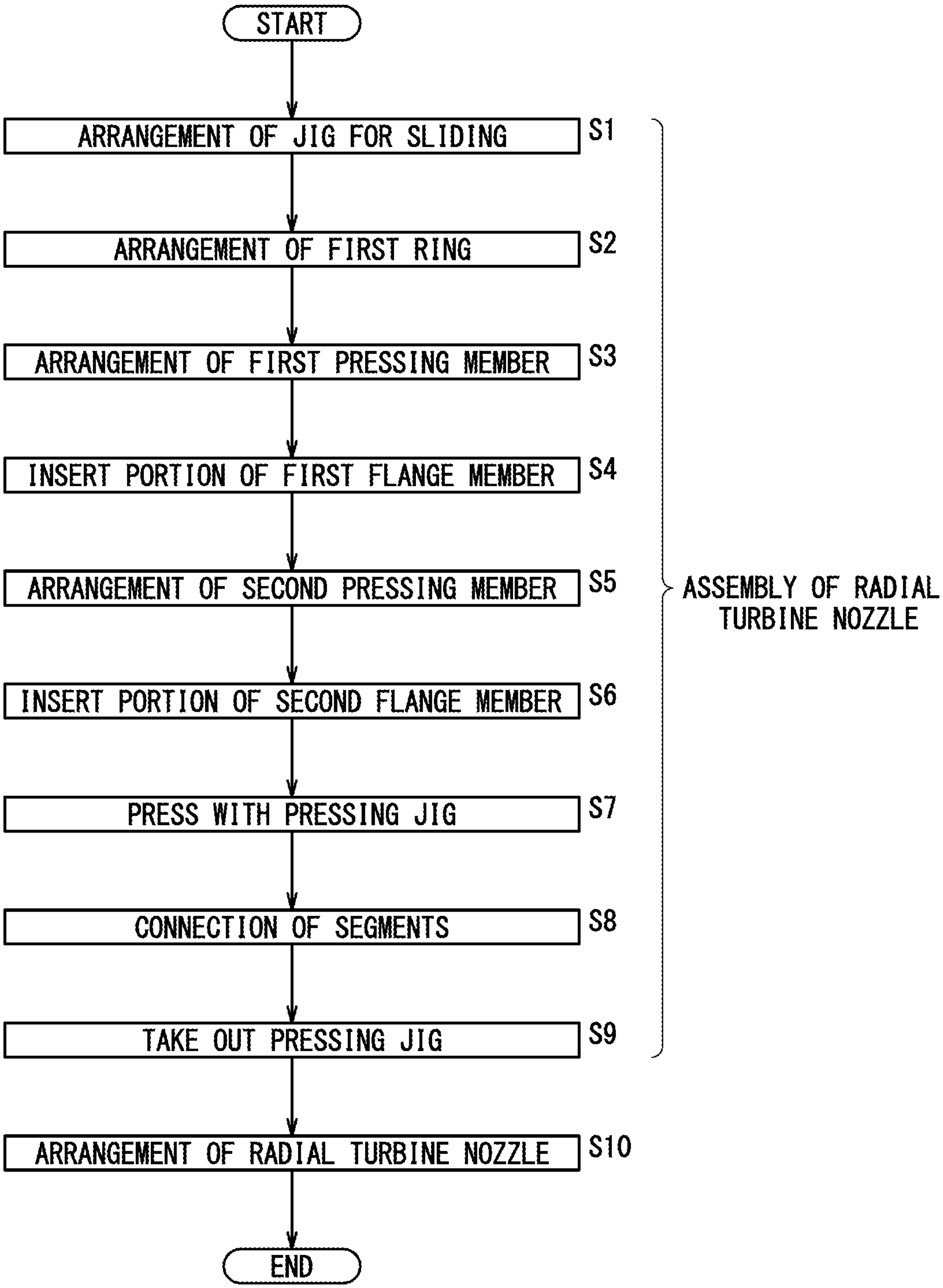
FIG. 9 is a flowchart showing a method of assembling the radial turbine nozzle, and a method of assembling the radial turbine nozzle to the gas turbine.
Figure 10:
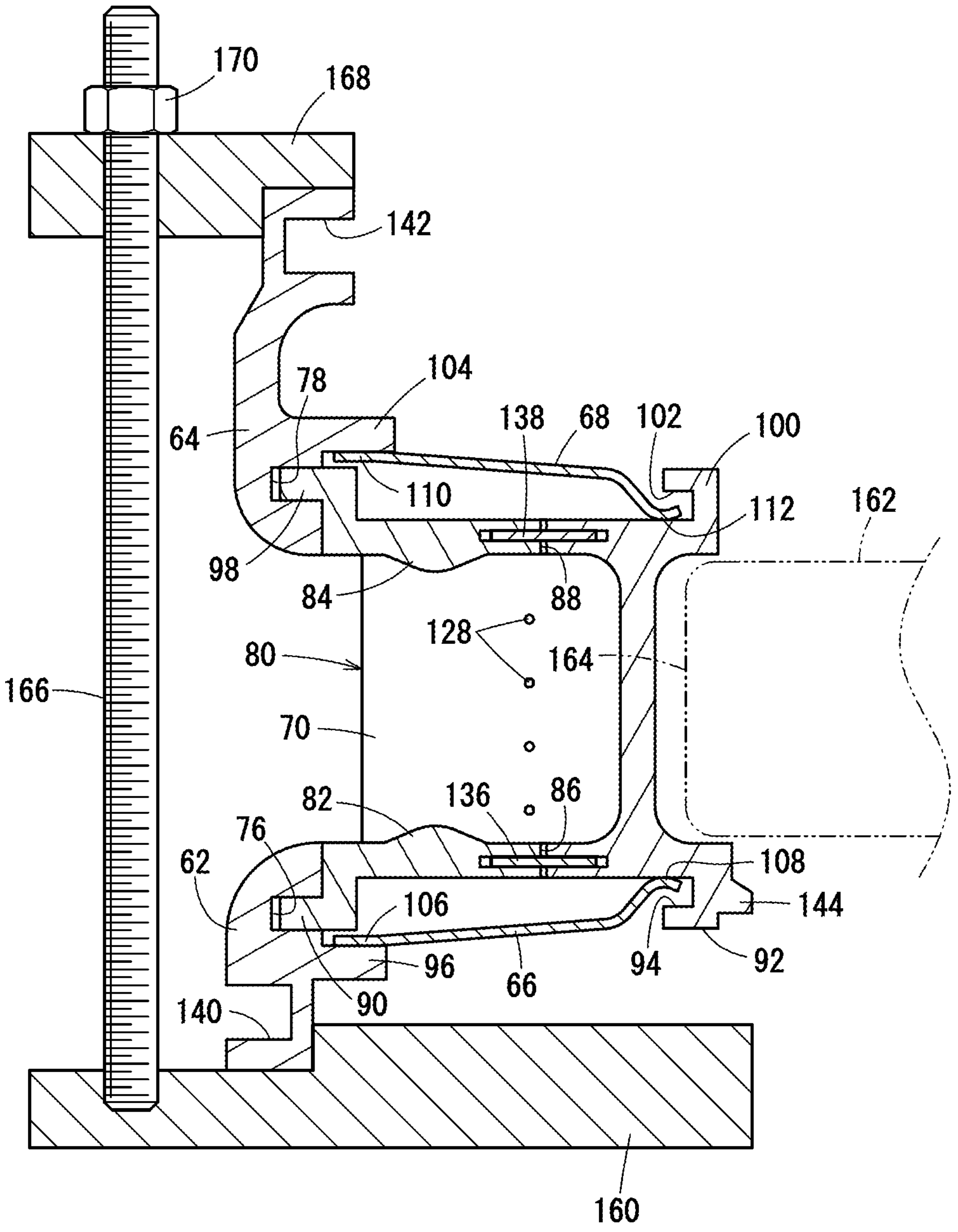
FIG. 10 is a cross-sectional view illustrating the method of assembling the radial turbine nozzle.

Next, in step S2 (first ring arrangement step) of FIG. 9, the first ring 62 is arranged on a top surface of the base jig 160 (refer to FIG. 10). The first ring 62 is arranged on the top surface of the base jig 160 through the jig for sliding 162.

In the following step S3 (first pressing member arrangement step), the first pressing member 66 is arranged on the first ring 62. The first pressing member 66 is arranged on the first ring 62 through the jig for sliding 162.

In the following step S4 (first flange member insertion step), in relation to each of the plurality of segments 80, a portion of the first flange member 90 (one end side in the circumferential direction of the first flange member 90) is inserted into the first outer side groove 76 of the first ring 62. Moreover, for each of the plurality of segments 80, the first seal member 136 is inserted beforehand into one of the first insertion grooves 132, and the second seal member 138 is inserted beforehand into one of the second insertion grooves 134. In this case, the other end side in the circumferential direction of the first flange member 90 is arranged on an inner side in the radial direction relative to the one end side in the circumferential direction of the first flange member 90. Accordingly, the other end side in the circumferential direction of the first flange member 90 is not yet inserted into the first outer side groove 76. Consequently, in a state in which the first seal member 136 and the second seal member 138 have been inserted beforehand, each of the plurality of segments 80 is arranged between the first flange member 90 and the outer circumferential surface of the jig for sliding 162. Further, each of the plurality of segments 80 is arranged in a manner such that two of the segments 80 which are adjacent to each of the in the circumferential direction are spaced apart from each other.

In the following step S5 (second pressing member arrangement step), the second pressing member 68 is arranged with respect to the plurality of segments 80.

In the following step S6 (second flange member insertion step), in relation to each of the plurality of segments 80, the second flange member 98 is arranged by a portion of the second flange member 98 (one end side in the circumferential direction of the second flange member 98) being inserted into the second outer side groove 78 of the second ring 64. In this case, the other end side in the circumferential direction of the second flange member 98 is arranged on an inner side in the radial direction relative to the one end side in the circumferential direction of the second flange member 98. Accordingly, the other end side in the circumferential direction of the second flange member 98 is not yet inserted into the second outer side groove 78.

In the following step S7, initially, a bolt 166 is attached to the base jig 160. Next, a pressing jig 168 is passed through the bolt 166. The pressing jig 168 contacts the second ring 64. Next, a nut 170 is attached to the bolt 166. Next, by moving the nut 170 to a predetermined position on the bolt 166, a force in the axial direction of the bolt 166 is applied with respect to the first ring 62, the first pressing member 66, the plurality of segments 80, the second pressing member 68, and the second ring 64. Consequently, the first ring 62, the first pressing member 66, the plurality of segments 80, the second pressing member 68, and the second ring 64 are retained with respect to the axial direction. Moreover, the axial direction of the bolt 166 is the axial direction of the jig for sliding 162, and together therewith, coincides with the axial direction of the nozzle main body 60 (the axial direction of the radial turbine 18).

In the following step S8 (segment connecting step), while each of the plurality of segments 80 are made to rotate, the plurality of segments 80 are connected together in the circumferential direction by causing them to slide toward the outer side in the radial direction of the first ring 62. For example, in the case that the jig for sliding 162 is used, the jig for sliding 162 is made to rotate about its axis. Consequently, the plurality of pressing members 164 of the jig for sliding 162 press the inner circumferential portions of the plurality of segments 80 toward the outer side in the radial direction of the jig for sliding 162. As a result, each of the plurality of segments 80 is made to slide toward the outer side in the radial direction. At this time, the first divided surfaces 86 and the second divided surfaces 88 of two of the segments 80 that are adjacent in the circumferential direction of the jig for sliding 162 are overlapped. As a result, a plurality of segments 80 are connected in the circumferential direction of the jig for sliding 162, thereby forming the nozzle main body 60.

Figure 11B:
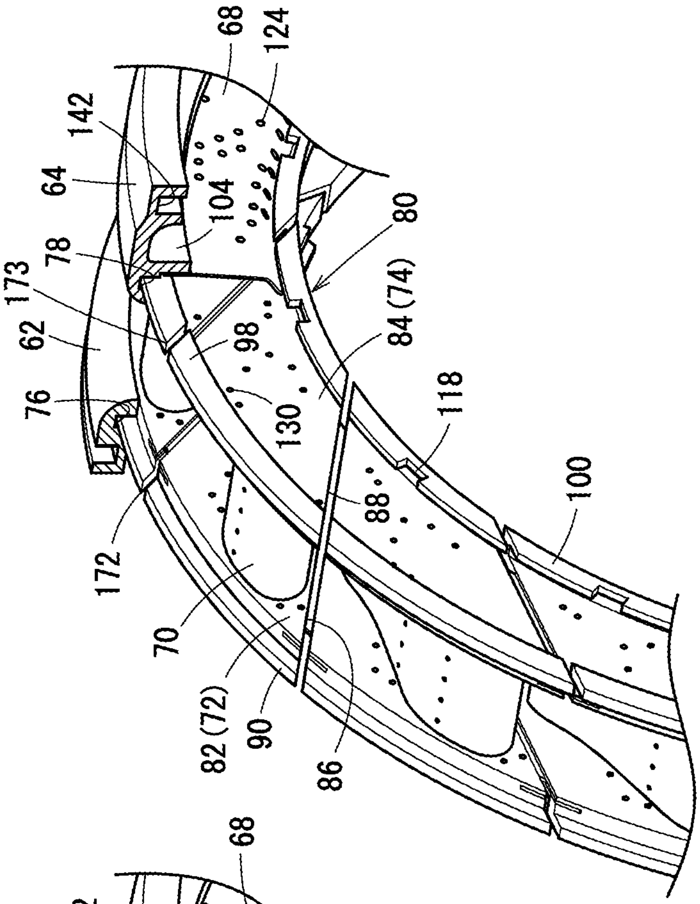
FIG. 11A and FIG. 11B are partial perspective views illustrating the connection of a plurality of segments.
Figure 11A:
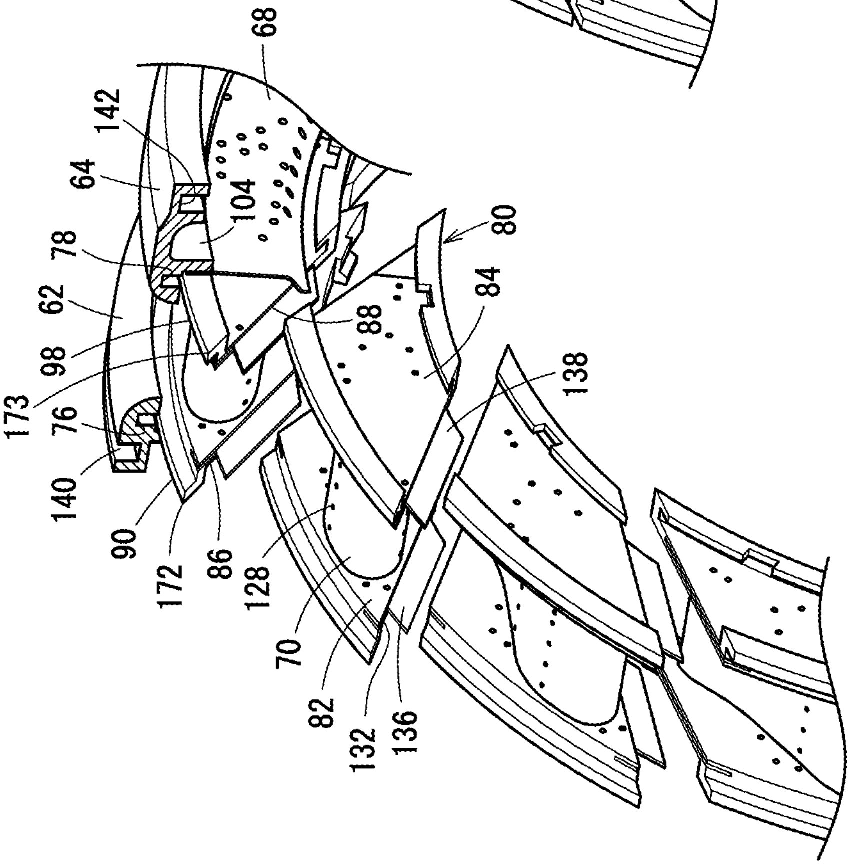

Hereinafter, the segment connecting step will be described in more specific detail. Accompanying the rotation of the jig for sliding 162, the plurality of segments 80 move toward the outer side in the radial direction from the state shown in FIG. 11A. When the jig for sliding 162 rotates further, each of the plurality of segments 80 rotates to the outer side in the radial direction, using each of a corner part 172 (one end side in the circumferential direction of the first flange member 90) of the outer circumferential portion of the first divided annular portion 82, and a corner part 173 (one end side in the circumferential direction of the second flange member 98) of the outer circumferential portion of the second divided annular portion 84 as a fulcrum. Consequently, as shown in FIG. 11B, the entire circumferential length of the first flange member 90 is inserted into the first outer side groove 76, and together therewith, the entire circumferential length of the second flange member 98 is inserted into the second outer side groove 78. As a result, the first divided surfaces 86 and the second divided surfaces 88 of two of the segments 80 that are adjacent in the circumferential direction overlap with each other. Further, concerning the two of the segments 80 that are adjacent in the circumferential direction, the first seal members 136 thereof are inserted into the first insertion grooves 132 in facing relation to each other, together with the second seal members 138 thereof being inserted into the second insertion grooves 134 (refer to FIG. 3) in facing relation to each other. In accordance therewith, the space between the two of the segments 80 that are adjacent in the circumferential direction is sealed by the first seal member 136 and the second seal member 138. In this manner, the two of the segments 80 that are adjacent in the circumferential direction are connected.

In the foregoing manner, in a state with the clearance provided between two of the segments 80 that are adjacent to each other, a portion of the segments 80 is inserted into the first ring 62 and the second ring 64, and the segments 80 are rotated using each of the corner part 172 of the outer circumferential portion of the first divided annular portion 82, and the corner part 173 of the outer circumferential portion of the second divided annular portion 84 as a fulcrum. Consequently, the plurality of segments 80 can be easily and stably connected together.

Further, in step S8, accompanying the plurality of segments 80 being connected together in the circumferential direction of the jig for sliding 162, the inner circumferential portion 108 of the first pressing member 66 is inserted into the first inner side groove 94, and together therewith, the inner circumferential portion 112 of the second pressing member 68 is inserted into the second inner side groove 102. As a result, each of the plurality of segments 80 is positioned in the axial direction of the nozzle main body 60.

Furthermore, in step S8, accompanying the plurality of segments 80 being connected together in the circumferential direction of the jig for sliding 162, the first projection 116 of the first pressing member 66 is inserted into the first notch member 114, together with the second projection 120 of the second pressing member 68 being inserted into the second notch member 118. In accordance with this feature, each of the plurality of segments 80 is positioned in the circumferential direction of the nozzle main body 60. As a result, the phases in the circumferential direction of the hollow portions 126, and the plurality of first holes 122 of the plurality of segments 80 can be placed in alignment (i.e., made to coincide) with each other.

In the foregoing manner, the radial turbine nozzle 10 is constructed.

In the following step S9, at first, the nut 170 is loosened, and the radial turbine nozzle 10 is released from being in a pressed state. Next, the nut 170 is taken out from the bolt 166, and the pressing jig 168 is taken out from the bolt 166. Next, the radial turbine nozzle 10 is taken out from the base jig 160.

Next, a description will be given concerning a method of assembling the radial turbine nozzle 10 to the gas turbine 12.

In such a method of assembling, in step S10 (nozzle arrangement step), the radial turbine nozzle 10, which is assembled in accordance with each of the above-described steps S1 to S9 (nozzle assembly step), is arranged in the first holder 34 on an outer side in the radial direction. Specifically, the radial turbine nozzle 10 is arranged on the first holder 34 and the second holder 36, in a manner so that the inner circumferential portion of the nozzle main body 60 is capable of being seated with respect to the first holder 34, and the plurality of segments 80 are capable of moving in the radial direction. The radial turbine nozzle 10 is arranged in a state that includes the clearances 148 and 150 in the radial direction with respect to the first holder 34 and the second holder 36.

The inner circumferential portion of the plurality of segments 80 is seated on the first holder 34 by the pressure of the combustion gas during the time that the gas turbine 12 is operated. Specifically, when the combustion gas collides against the plurality of blades 70, a pressing force toward the inner side in the radial direction acts on each of the plurality of segments 80. Consequently, each of the plurality of segments 80 moves toward the inner side in the radial direction. As a result, as shown in FIG. 7, the inner circumferential portion of each of the first divided annular portions 82 of the plurality of segments 80 is seated on the first holder 34. As a result, the radial turbine nozzle 10 is positioned and fixed in place in the radial direction of the radial turbine 18.

Moreover, in the above description, a case has been described in which the first seal member 136 is inserted into the first insertion grooves 132, and the second seal member 138 is inserted into the second insertion grooves 134. According to the present embodiment, it is sufficient if the first seal member 136 and the second seal member 138 are capable of being retained between the two of the adjacent segments 80. Therefore, in the present embodiment, the first seal member 136 may be inserted into slots (recesses) formed in the plurality of first divided surfaces 86. Further, the second seal member 138 may be inserted into slots (recesses) formed in the plurality of second divided surfaces 88.

Further, in the method of assembling the radial turbine nozzle shown in FIG. 9, without using the jig for sliding 162, the plurality of segments 80 may be circumferentially connected by an operator manually causing the plurality of segments 80 to move to the outer side in the radial direction.

The invention that can be grasped from the above-described embodiment will be discussed below.

The first aspect of the present invention is characterized by the gas turbine (12) including the radial turbine (18), the radial turbine nozzle (10) surrounding the radial turbine, and the retaining member (34) configured to retain the radial turbine nozzle, the radial turbine nozzle including the annular shaped nozzle main body (60) including the plurality of blades (70) arranged at the predetermined interval in the circumferential direction of the radial turbine, the first end wall (72) connected to one end part of each of the plurality of blades in the axial direction of the radial turbine, and the second end wall (74) connected to the other end part of each of the plurality of blades in the axial direction, the first ring (62) surrounding the first end wall, and the second ring (64) surrounding the second end wall, wherein the nozzle main body includes the plurality of segments (80) connected in the circumferential direction, the first ring includes the first outer side groove (76) that is recessed toward the outer side of the radial turbine in the radial direction, and extends in the circumferential direction, the second ring includes the second outer side groove (78) that is recessed toward the outer side in the radial direction, and extends in the circumferential direction, each of the plurality of segments includes the first divided annular portion (82) formed by dividing the first end wall at the plurality of first divided surfaces (86) that are inclined with respect to the radial direction, and the second divided annular portion (84) formed by dividing the second end wall at the plurality of second divided surfaces (88) that are inclined with respect to the radial direction, and wherein the outer circumferential portion of the first divided annular portion includes the first flange member (90) that projects toward the outer side in the radial direction, the first flange member being inserted into the first outer side groove, the outer circumferential portion of the second divided annular portion includes the second flange member (98) that projects toward the outer side in the radial direction, the second flange member being inserted into the second outer side groove, the inner circumferential portion of the nozzle main body is configured to be seated on the retaining member; and the plurality of segments are configured to move in the radial direction.

According to the present invention, during operation of the gas turbine, the inner circumferential portion of the nozzle main body is seated on the retaining member by the pressure of the combustion gas passing through the radial turbine nozzle. During operation of the gas turbine, the retaining member is at a lower temperature than the radial turbine nozzle. Therefore, a dimensional change of the retaining member due to thermal expansion is small. As a result, the radial turbine nozzle assembled to the gas turbine can be accurately positioned and fixed. Further, the first divided surface and the second divided surface are inclined with respect to the radial direction of the radial turbine. Accordingly, when the combustion gas passes through the radial turbine nozzle, the plurality of segments can be easily moved in the radial direction of the radial turbine. Further, since there is a clearance between the retaining member and the radial turbine nozzle, the radial turbine nozzle can be easily assembled to the gas turbine.

According to the first aspect of the present invention, the first insertion groove (132) may be formed in each of the plurality of first divided surfaces, the second insertion groove (134) may be formed in each of the plurality of second divided surfaces, the first seal member (136) may be inserted into the first insertion groove, and the second seal member (138) may be inserted into the second insertion groove.

Since the first seal member and the second seal member do not press the plurality of segments, it is possible to easily move the plurality of segments inward in the radial direction of the radial turbine by the pressure of the combustion gas.

A second aspect of the present invention is characterized by the method of assembling the radial turbine nozzle, wherein the radial turbine nozzle includes the annular shaped nozzle main body including the plurality of blades arranged at the predetermined interval in the circumferential direction of the radial turbine, the first end wall connected to one end part of each of the plurality of blades in the axial direction of the radial turbine, and the second end wall connected to the other end part of each of the plurality of blades in the axial direction, the first ring surrounding the first end wall, and the second ring surrounding the second end wall, wherein the nozzle main body includes the plurality of segments connected in the circumferential direction, the first ring includes the first outer side groove that is recessed toward the outer side of the radial turbine in the radial direction, and extends in the circumferential direction, the second ring includes the second outer side groove that is recessed toward the outer side in the radial direction, and extends in the circumferential direction, each of the plurality of segments includes the first divided annular portion formed by dividing the first end wall at the plurality of first divided surfaces that are inclined with respect to the radial direction, and the second divided annular portion formed by dividing the second end wall at the plurality of second divided surfaces that are inclined with respect to the radial direction, and wherein the outer circumferential portion of the first divided annular portion includes the first flange member that projects toward the outer side in the radial direction, the first flange member being inserted into the first outer side groove, the outer circumferential portion of the second divided annular portion includes the second flange member that projects toward the outer side in the radial direction, the second flange member being inserted into the second outer side groove, the method of assembling the radial turbine nozzle including the nozzle assembly step of assembling the radial turbine nozzle in the manner so that the first ring and the second ring are assembled to the outer circumferential portion of the nozzle main body (steps S1 to S9), and the nozzle arrangement step of arranging the radial turbine nozzle on the outer side of the retaining member of the gas turbine in the radial direction in the manner so that the inner circumferential portion of the nozzle main body is configured to be seated on the retaining member and the plurality of segments are configured to move in the radial direction (step S10).

According to the present invention, during operation of the gas turbine, the inner circumferential portion of the nozzle main body is seated on the retaining member by the pressure of the combustion gas passing through the radial turbine nozzle. During operation of the gas turbine, the retaining member is at a lower temperature than the radial turbine nozzle. Therefore, a dimensional change of the retaining member due to thermal expansion is small. As a result, the radial turbine nozzle assembled to the gas turbine can be accurately positioned and fixed. Further, the first divided surface and the second divided surface are inclined with respect to the radial direction of the radial turbine. Accordingly, when the combustion gas passes through the radial turbine nozzle, the plurality of segments can be easily moved in the radial direction of the radial turbine. Further, since there is a clearance between the retaining member and the radial turbine nozzle, the radial turbine nozzle can be easily assembled to the gas turbine.

Moreover, it should be noted that the present invention is not limited to the disclosure described above, and various configurations may be adopted therein without departing from the essence and gist of the present invention.

The invention claimed is:

1. A gas turbine comprising a radial turbine, a radial turbine nozzle surrounding the radial turbine, and a retaining member retaining the radial turbine nozzle, the radial turbine nozzle including:

an annular shaped nozzle main body including a plurality of blades arranged at a predetermined interval in a circumferential direction of the radial turbine, a first end wall connected to one end part of each of the plurality of blades in an axial direction of the radial turbine, and a second end wall connected to another end part of each of the plurality of blades in the axial direction;

a first ring surrounding the first end wall; and a second ring surrounding the second end wall, wherein the nozzle main body includes a plurality of segments connected in the circumferential direction;

the first ring includes a first outer side groove that is recessed toward an outer side of the radial turbine in a radial direction, and extends in the circumferential direction;

the second ring includes a second outer side groove that is recessed toward the outer side in the radial direction, and extends in the circumferential direction, each of the plurality of segments includes:

a first divided annular portion formed by dividing the first end wall at a plurality of first divided surfaces that are inclined with respect to the radial direction; and a second divided annular portion formed by dividing the second end wall at a plurality of second divided surfaces that are inclined with respect to the radial direction, and wherein an outer circumferential portion of the first divided annular portion includes a first flange member that projects toward the outer side in the radial direction, the first flange member being inserted into the first outer side groove;

an outer circumferential portion of the second divided annular portion includes a second flange member that projects toward the outer side in the radial direction, the second flange member being inserted into the second outer side groove;

the retaining member is an annular shaped hollow body and is provided so that an inner circumferential portion of the nozzle main body is seated on the retaining member;

the plurality of segments are configured to move in the radial direction.

2. The gas turbine according to claim 1, wherein:

a first insertion groove is formed in each of the plurality of first divided surfaces;

a second insertion groove is formed in each of the plurality of second divided surfaces;

a first seal member is inserted into the first insertion groove; and a second seal member is inserted into the second insertion groove.

3. A method of assembling a radial turbine nozzle, wherein the radial turbine nozzle comprises:

an annular shaped nozzle main body including a plurality of blades arranged at a predetermined interval in a circumferential direction of the radial turbine, a first end wall connected to one end part of each of the plurality of blades in an axial direction of the radial turbine, and a second end wall connected to another end part of each of the plurality of blades in the axial direction;

a first ring surrounding the first end wall; and a second ring surrounding the second end wall, wherein the nozzle main body includes a plurality of segments connected in the circumferential direction;

the first ring includes a first outer side groove that is recessed toward an outer side of the radial turbine in a radial direction, and extends in the circumferential direction;

the second ring includes a second outer side groove that is recessed toward the outer side in the radial direction, and extends in the circumferential direction, each of the plurality of segments includes:

a first divided annular portion formed by dividing the first end wall at a plurality of first divided surfaces that are inclined with respect to the radial direction; and a second divided annular portion formed by dividing the second end wall at a plurality of second divided surfaces that are inclined with respect to the radial direction, and wherein an outer circumferential portion of the first divided annular portion includes a first flange member that projects toward the outer side in the radial direction, the first flange member being inserted into the first outer side groove;

an outer circumferential portion of the second divided annular portion includes a second flange member that projects toward the outer side in the radial direction, the second flange member being inserted into the second outer side groove, the method of assembling the radial turbine nozzle comprising:

assembling the radial turbine nozzle in a manner so that the first ring and the second ring are assembled to an outer circumferential portion of the nozzle main body; and arranging the radial turbine nozzle on an outer side of a retaining member, which is an annular shaped hollow body, of a gas turbine in the radial direction in a manner so that an inner circumferential portion of the nozzle main body is configured to be seated on the retaining member and the plurality of segments are configured to move in the radial direction.

* * * * *